United States Patent [19]

Powers

[11] Patent Number: 4,533,951
[45] Date of Patent: Aug. 6, 1985

[54] SYSTEM FOR GENERATING AND DISPLAYING A COMPATIBLE HIGH DEFINITION TELEVISION SIGNAL BY PROGRESSIVE SCANNING

[75] Inventor: Kerns H. Powers, Princeton, N.J.

[73] Assignee: RCA Corporation, Princeton, N.J.

[21] Appl. No.: 424,232

[22] Filed: Sep. 27, 1982

[51] Int. Cl.³ .............................................. H04N 7/04
[52] U.S. Cl. .................................................. 358/141
[58] Field of Search .................................. 358/12, 141

[56] References Cited

FOREIGN PATENT DOCUMENTS

| | | |
|---|---|---|
| 428926 | 5/1935 | United Kingdom . |
| 753085 | 9/1936 | United Kingdom . |
| 503555 | 4/1939 | United Kingdom . |
| 701902 | 1/1954 | United Kingdom . |
| 850024 | 9/1960 | United Kingdom . |
| 864233 | 3/1961 | United Kingdom . |
| 871155 | 6/1961 | United Kingdom . |
| 926798 | 5/1963 | United Kingdom . |
| 931277 | 7/1963 | United Kingdom . |
| 2101835 | 1/1983 | United Kingdom . |
| 2107151 | 4/1983 | United Kingdom . |

OTHER PUBLICATIONS

British Kinematography, "A Review of Television Recording, 1946–1956", vol. 31, No. 4, pp. 87–103, (Oct. 1957).
Journal of British Institution of Radio Engineers, "The Evaluation of Picture Quality with Special Reference to Television Systems", (Phelp), pp. 211–253, (Apr. 1952).
"The Relation Between Picture Size, Viewing Distance and Picture Quality", Proc. Instn, Elect. Engrs., Paper 254OR, (Feb. 1958), 10 pages.

Primary Examiner—Richard Murray
Attorney, Agent, or Firm—P. J. Rasmussen; P. M. Emanuel; R. G. Coalter

[57] ABSTRACT

A high-definition camera uses sinuous or line scanning to produce wide bandwidth signals having high-definition in the horizontal and vertical directions. A wobble signal having a wobble chosen at an even integer multiple of one-half the line rate is used to create the sinuous scanning. The phase of the wobble signal is inverted on alternate frames to provide a full raster scan on a high-definition television receiver. A low pass filter produces a limited bandwidth signal from the wide bandwidth signal. The limited bandwidth signal is compatible with standard definition broadcast systems and receivers. At the receiver the high-definition image may be recreated by using a delta signal representative of the difference between the high-definition signal and the standard definition signal in conjunction with the limited bandwidth signal. The delta signal and its addresses may be transmitted during the vertical blanking interval. In order to reduce the data rate of the delta signal its generation is inhibited in regions of the picture which exhibit frame-to-frame motion.

17 Claims, 21 Drawing Figures

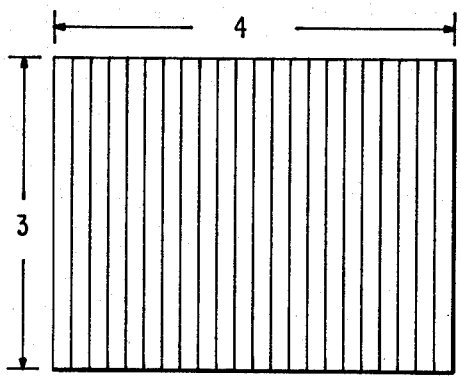
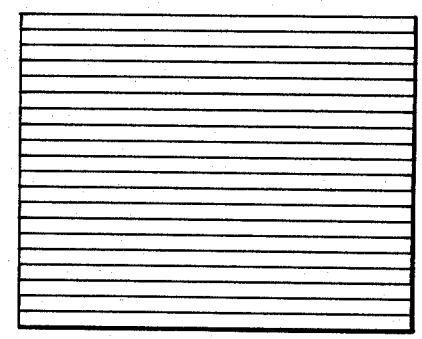
Fig. 1        Fig. 2
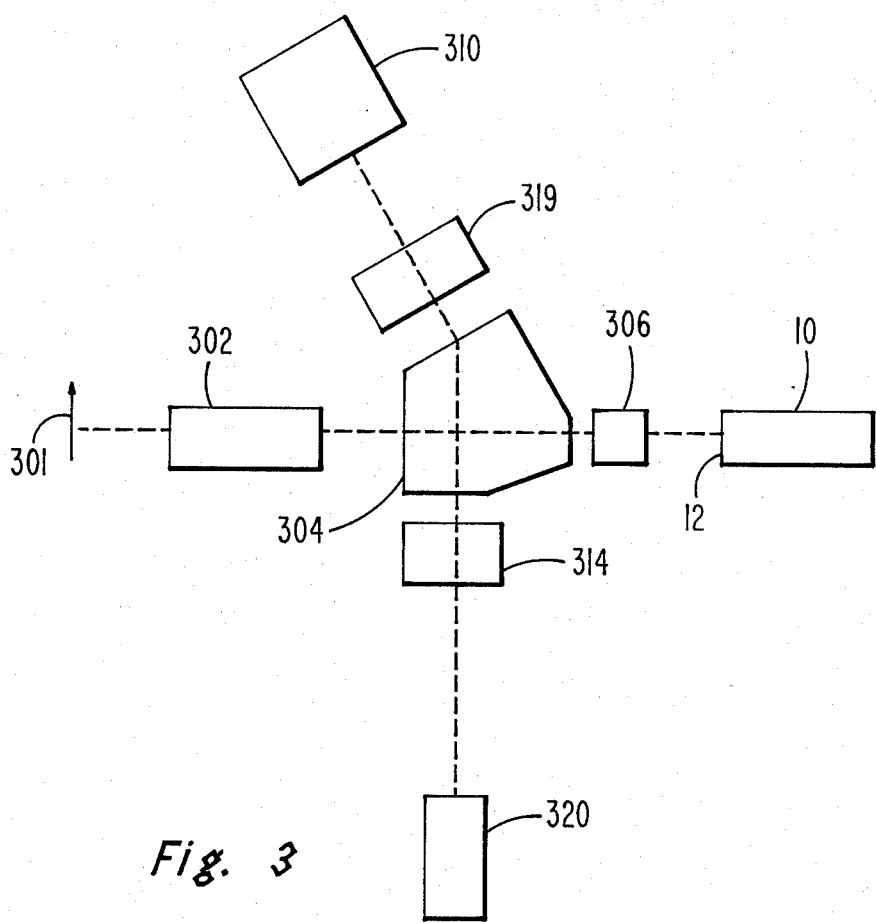
Fig. 3

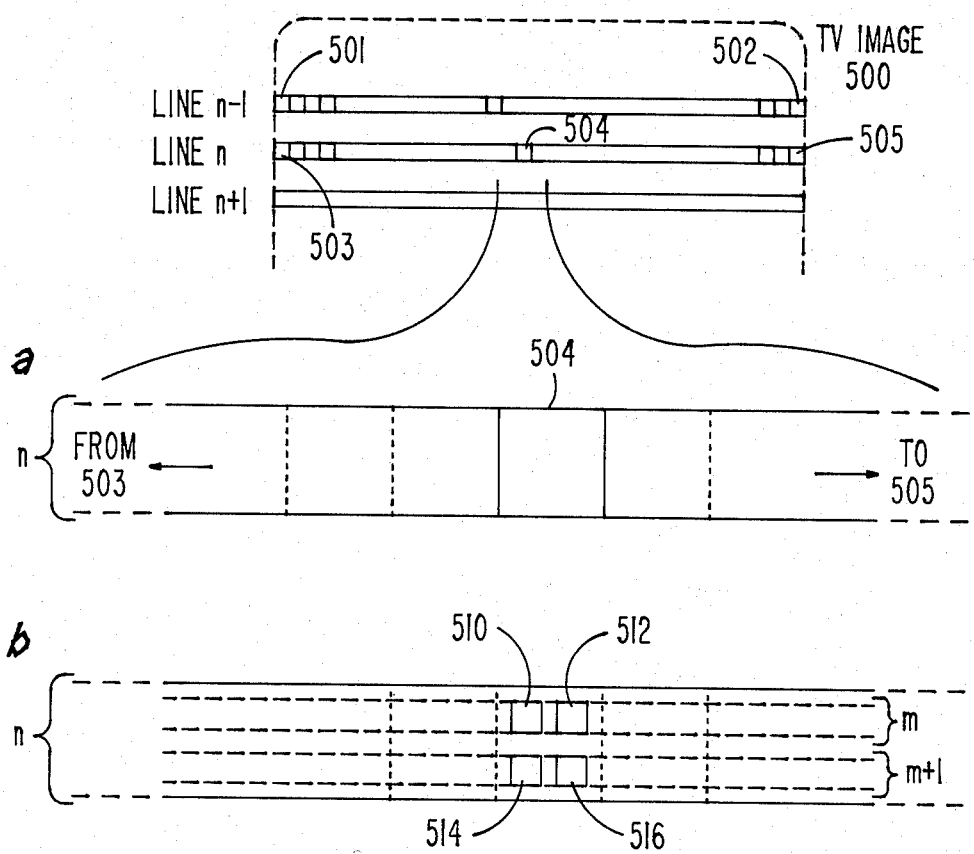
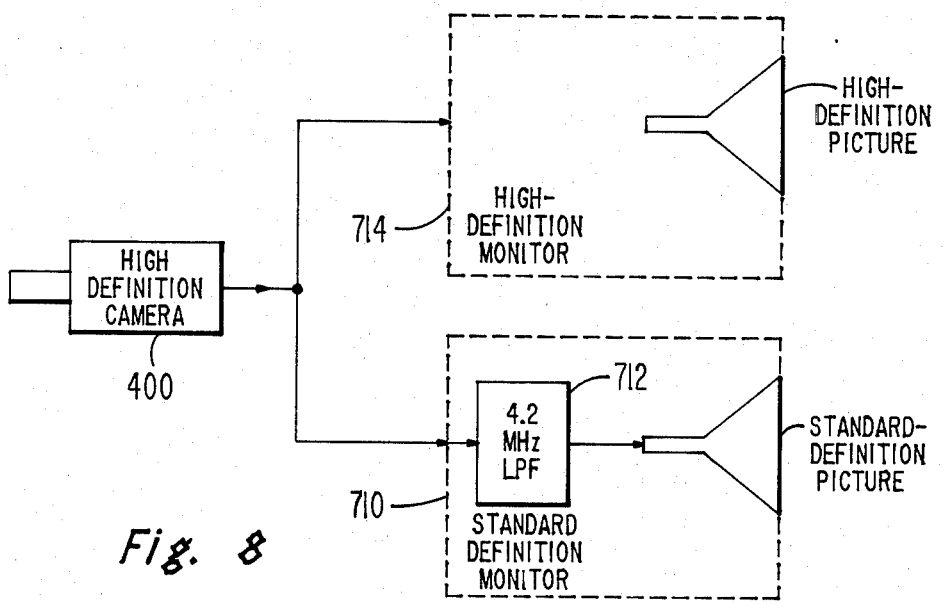
Fig. 5
Fig. 8

SUBCARRIER PHASE

SYSTEM FOR GENERATING AND DISPLAYING A COMPATIBLE HIGH DEFINITION TELEVISION SIGNAL BY PROGRESSIVE SCANNING

This invention relates to a high-definition television (HDTV) system having increased horizontal and vertical resolution and which is compatible with major standef (standard-definition) television standards.

BACKGROUND OF THE INVENTION

A standard NTSC television scans 525 lines per frame in the form of two sequential fields of 262½ lines each. The lines of each field interlace with the lines of adjacent fields and the eye integrates these interlaced lines to reduce the effect of a 30 Hz frame-rate flicker. The horizontal line structure is still visible under certain circumstances, however, and is particularly visible on large-screen television displays viewed from a relatively close distance. The problem is made even more severe by the ultra-large pictures formed by projection-type television displays. The advantages of such ultra-large pictures in providing the illusion of surrounding the viewer are reduced by the need for the viewer to remain sufficiently far from the display to integrate the line structure.

A compatible high-definition television system is described in U.S. patent application Ser. No. 288,753 filed July 31, 1981, now U.S. Pat. No. 4,429,327 in the names of C. B. Oakley and R. A. Dischert which issued Jan. 31, 1984, as U.S. Pat. No. 4,429,327. In this system, the visibility of the horizontal line structure is reduced in a manner compatible with standef NTSC (or PAL) television receivers by using a camera which generates two lines for every standard line (for example, 1,050 lines-per-frame rather than 525), forming separate signals related to the sums and differences of pixels on adjacent raster lines, and transmitting as a compatible signal the sum signal, together with the difference signal, which may be transmitted separately or concealed within a composite color signal. This arrangement increases the vertical resolution by increasing the number of horizontal lines, which makes it possible to view an ultra-large picture from a closer distance without discerning the line structure. With this system, the vertical luminance resolution becomes about 970 lines, while the horizontal resolution, which is established by the luminance bandwidth, remains at about 330 television lines per picture height. The horizontal resolution thus becomes the limiting factor in the distance between the viewer and an ultra-large display, once the line structure becomes invisible.

Another compatible high-definition television system is described in U.S. patent application Ser. No. 687,462 filed Dec. 28, 1984, which is a continuation-in-part of U.S. patent application Ser. No. 352,001 filed Feb. 24, 1982, in the name of R. N. Hurst. In this system, the scanning spot in the camera is wobbled to double the resolution in both the horizontal and vertical directions of the high-definition display. The wider bandwidth signal which is transmitted is compatible with standard television receivers, the effect of the narrow bandwidth of such receives is to average the values of adjacent pixels in both horizontal and vertical directions. In the high-definition wider bandwidth television receiver, the scanning spot is synchronized to wobble in accordance with the wobble that was introduced by the camera. According to Hurst, the spot is wobbled at a rate equal to an odd integer multiple of one-half of the horizontal scan frequency so that a complete high-definition raster of pixels is traced out over four successive fields.

A disadvantage of spot wobbling at an odd integrer multiple of one-half the horizontal line rate is that certain scanning artifacts on the television display may become visible and be objectionable to the viewer. When the spot is wobbled at an odd integer multiple of one-half the horizontal rate the wobble phase on successive lines of a given field differ by 180°. Therefore, the scanning line structure will display a visible high-frequency modulation of the space between adjacent lines of the same field giving the picture an appearance of an array of black dots superimposed over the image. The interstitial lines of one field will not overlay on the black spaces of the previous field and thus the array of black dots will appear to move either vertically, horizontally, or along 45° lines in any of four directions.

If the spot wobbling frequency is chosen to be an even integer multiple of one-half of the line rate a herringbone pattern of lines is produced on the display. In this case the interstitial scan lines of one field do overlay the black lines of the previous field, however, not all of the picture elements of a high-definition television raster will be scanned resulting in a lack of full resolution on the display.

SUMMARY OF THE INVENTION

In accordance with the principles of the present invention the disadvantages of the prior art are eliminated or reduced by providing a system for generating and displaying a compatible high-definition television signal using a wobble frequency of an even integer multiple of one-half of the line rate which produces a raster having full resolution.

Further, in accordance with one aspect of the present invention a compatible high-definition television signal is provided which is generated in a digital manner.

In accordance with still another aspect of the present invention a compatible high-definition television system is provided having progressive scanning at the camera and display to avoid the need of spot wobble and to eliminate interline and pixel flicker at less than field rate.

The high-definition television system of the present invention includes means for scanning an image at a first predetermined rate in a first direction and at a second predetermined rate in a second direction orthogonal to the first. Means are provided for selecting non-adjacent time successive picture elements scanned in said first direction wherein the picture elements are selected from non-adjacent positions in the second direction. The selecting means in combination with the scanning means effects a wobble scanning of the image such that the image is scanned in the second direction at a third rate greater than the first rate. The third rate which is an integer multiple of one-half of the first predetermined rate produces a high-resolution scan in both the first and second directions. The system further includes inverter means for switching the selecting means such that the selecting means selects alternate non-adjacent, time successive picture elements scanned in the first direction at a rate equal to one-half of the second predetermined rate.

BRIEF DESCRIPTION OF THE DRAWING

Other features and advantages of the invention will be more fully understood from the following detailed description of the preferred embodiment, the appended claims and the accompanying drawing in which:

FIGS. 1 and 2 illustrate vertical and horizontal lines on a raster, respectively;

FIG. 3 illustrates the optical portions of a color camera according to an embodiment of the invention;

FIGS. 5 and 6a–d illustrate in detail the nature of the scanning pattern of the camera of FIG. 4 or of a high resolution kinescope, according to an aspect of the invention;

FIG. 8 is a symbolic block diagram of a compatible television system according to the invention;

DESCRIPTION OF THE PREFERRED EMBODIMENTS

Figure 4:
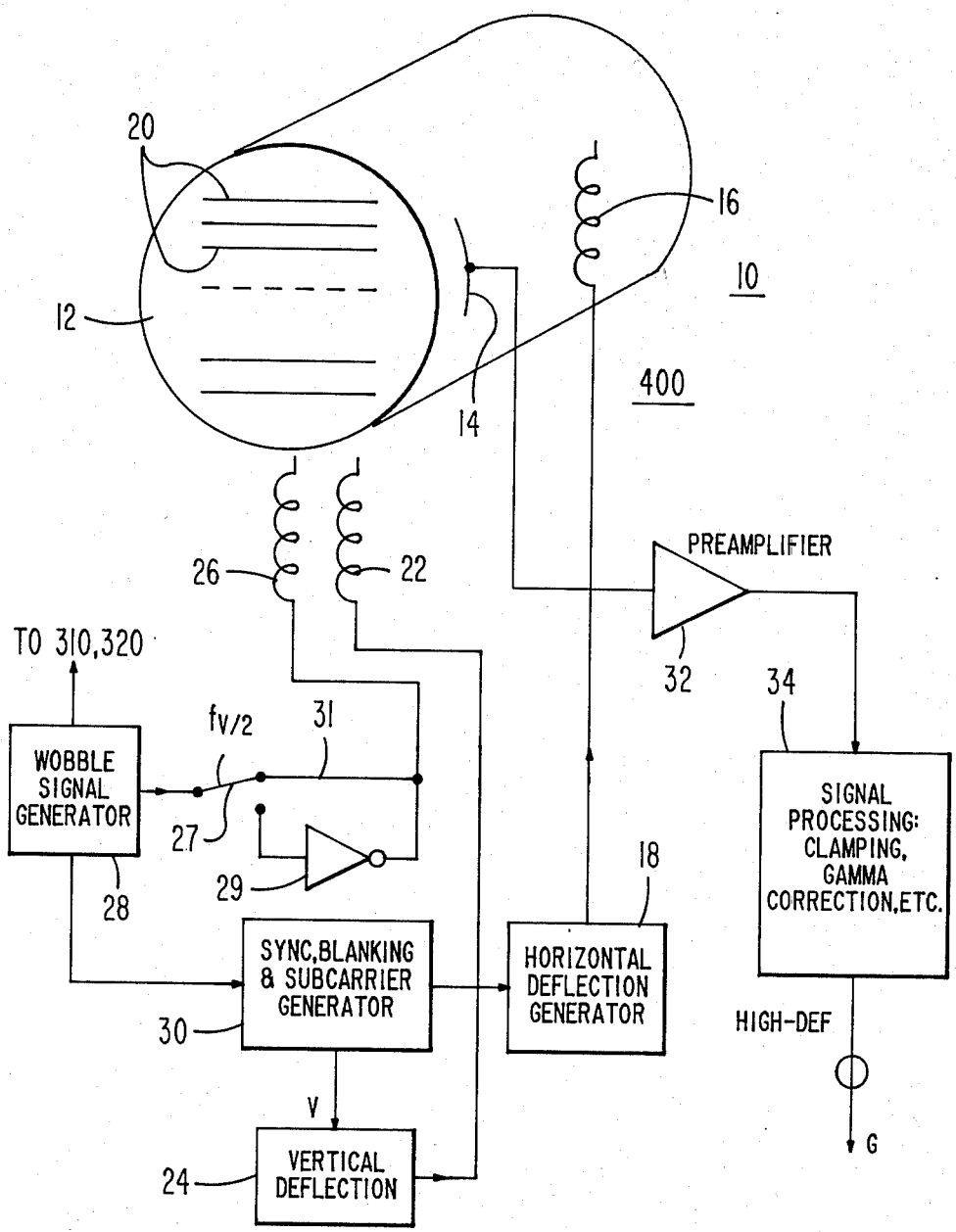
FIG. 4 illustrates camera vidicon and circuit arrangements, partially in block diagram form, according to the invention.

FIG. 1 illustrates a raster having an aspect ratio with a height of three units and a width of four units. The raster is scanned in the usual fashion by successive horizontal lines (not shown). Alternate light and dark vertical lines are displayed on the raster. The light and dark lines are related to the frequency of the signal being processed. The horizontal scanning time in NTSC is 63.5 microseconds of which approximately 10 microseconds is used for horizontal retrace and blanking, leaving approximately 53 microseconds as the duration of the active line scan. The alternate light and dark lines formed on the raster in FIG. 1 require positive- and negative-going signal excursions, the rate of which is determined by the number and relative physical spacing of the lines of the object to be televised. The luminance bandwidth of the television signal is effectively about 4 MHz as practiced in receivers, and thus the highest-frequency signal which can pass through the channel can go through a full cycle (one positive and one negative excursion of the luminance) in ¼ microsecond. In the 53 microseconds (the duration of the active portion of one horizontal line) approximately 220 complete cycles can take place. Thus, 220 black and 220 white lines can occur in one horizontal line, for a total of 440 television lines in a complete horizontal scan. However, in accordance with standard television practice, the horizontal resolution must be multiplied by ¾ in order to determine the standard resolution (the resolution which would occur if the raster were square and had a width equal to the height). Thus, the horizontal resolution is about 330 television lines for a 4 MHz bandwidth, or approximately 80 television lines per MHz. Using this criterion, the resolution in the horizontal direction for a color signal component having a 1.5 MHz bandwidth is about 120 television lines. The eye is much more sensitive to luminance variations than color variations, however, so that a picture having 120 lines of horizontal resolution in color and 330 lines in luminance will be perceived as having 330 line overall resolution.

In the vertical direction, each field consists of more than 250 scanned lines as symbolically shown in FIG. 2. The color resolution in the vertical direction is much better than in the horizontal direction because the horizontal resolution is limited by the chroma channel bandwidth as mentioned above to about 120 television lines, whereas the vertical color resolution is not determined by the channel bandwidth but rather by the number of horizontal lines by which the picture is sampled in the vertical direction. Consequently, the color resolution in the vertical direction exceeds the color resolution in the horizontal direction. The horizontal luminance resolution is generally considered to be inadequate and, as mentioned previously, the vertical luminance resolution is not adequate because the line structure can be seen in large picture displays.

FIG. 3 illustrates the optical portions of a high-resolution camera according to one aspect of the invention. In FIG. 3, light from a scene illustrated as an arrow 301 passes through an optical system illustrated by block 302 and into a color-splitting prism 304. Green (G) light passes as is known through further optics 306 as required for focusing onto the photosensitive element or faceplate 12 of a camera tube 10 (e.g., vidicon). The red (R) components of the light from the scene are separated by prism 304 and are focused by optics 319 onto the photosensitive element of vidicon 310. The blue (B) is similarly separated by prism 304 and focused by optics 314 onto the photosensitive element of vidicon 320. Vidicons 10, 310 and 320 may be of the diode-gun impregnated-cathode (DIS) saticon type or other type capable of resolution in excess of 1,000 lines both horizontally and vertically. The vidicons are registered as required to superpose the R, G and B rasters which they produce.

FIG. 4 illustrates in simplified form a high-resolution vidicon 10 and its associated circuitry. In the FIGURES elements designated with like numerals are the same or similar items in the various FIGURES. Vidicon 10 includes a faceplate 12 which includes on the back portion thereof a photosensitive target element coupled to a target electrode 14. An electron beam (not shown) deflected horizontally by magnetic fields associated with a horizontal deflection winding illustrated as 16 driven by a horizontal deflection generator 18 scans horizontally across faceplate 12 to produce horizontal scan lines illustrated as 20. The scanning electron beam is deflected in the vertical direction by a magnetic field associated with a vertical deflection winding 22 driven by a vertical deflection generator 24. An auxiliary deflection winding 26 is driven by a high-frequency signal from a wobble signal generator 28. The wobble signal produced by generator 28 is also applied as a timing signal to sychronizing signal, blanking signal and subcarrier signal generators illustrated together as block 30 by which horizontal deflection generator 18 and vertical deflection generator 24 are synchronized. The wobble signal produced by generator 28 is also applied to synchronization signal generators associated with vidicons 310 and 320 which correspond with sync generator 30. The scanning of the electron beam across faceplate 12 upon which the image is focused creates a signal at target electrode 14 in known fashion. The signal is representative of the brightness of image. The image representative signal from target 14 is applied to a preamplifier 32 and to signal processing circuits such as black-level clamping, gamma correction and so forth illustrated together as block 34. Interposed between wobble signal generator 28 and auxiliary deflection winding 26 are switch 27 and inverter 29 the operation of which will be described herein. Switch 27 switches the signal from wobble signal generator 28 so that it is transmitted alternatively through conductor 31 or inverter 29.

FIG. 5 illustrates a television raster or image designated generally as 500 together with three scan lines n−1, n and n+1 arbitrarily chosen from among the many scan lines making up the raster. Each scan line is made up of a large number of picture elements, or pixels, the size of which is determined by the resolution capability of the television system. For a standef NTSC television system, the number of picture elements in each line is about 700. The first pixel of line n−1 is designated 501 and the last pixel as 502. In the NTSC television system, lines n−1, n and n+1 are laid down sequentially during one television field and, therefore, are separated by a sufficient distance to accommodate the interlaced lines of a second field forming a television frame. In FIG. 5a the region about an arbitrarily chosen pixel 504 of line n has been expanded as an aid to understanding the invention. Those skilled in the art will understand that the square shape of the pixels is only illustrative. FIG. 5b illustrates a portion of a raster pattern of a DIS high-resolution saticon expanded as in FIG. 5a. Because of the high resolution of the saticon, the pixels are smaller so that four pixels illustrated as 510–516 fit within the same space occupied by a single pixel in a standef scan. Pixels 510 and 512 may be considered to be portions of a sub-raster line m while pixels 514 and 516 may be considered to be pixels of a sub-raster line m+1. A DIS-type saticon can have its beam deflected in such a manner as to produce a raster having 1,050 horizontal lines, each line of which contains approximately 1,400 pixels. When compared with the standef NTSC system, the number of scanning lines and the number of pixels per line are each doubled thus quadrupling the spatial resolution. If high-resolution signals derived from a high-resolution camera scanned as in FIG. 5b were to be transmitted to represent a picture utilizing the full resolution capability, and if that picture were to be transmitted at the rate of 30 frames per second as in standard NTSC, the required bandwidth would be four times the bandwidth required in the NTSC system, or 4.2 MHz×4=16.8 MHz.

Clearly, it is not possible to transmit a 16.8 MHz luminance signal through a standard 6 MHz NTSC channel having about 4.2 MHz allocated to luminance.

Figure 6A:
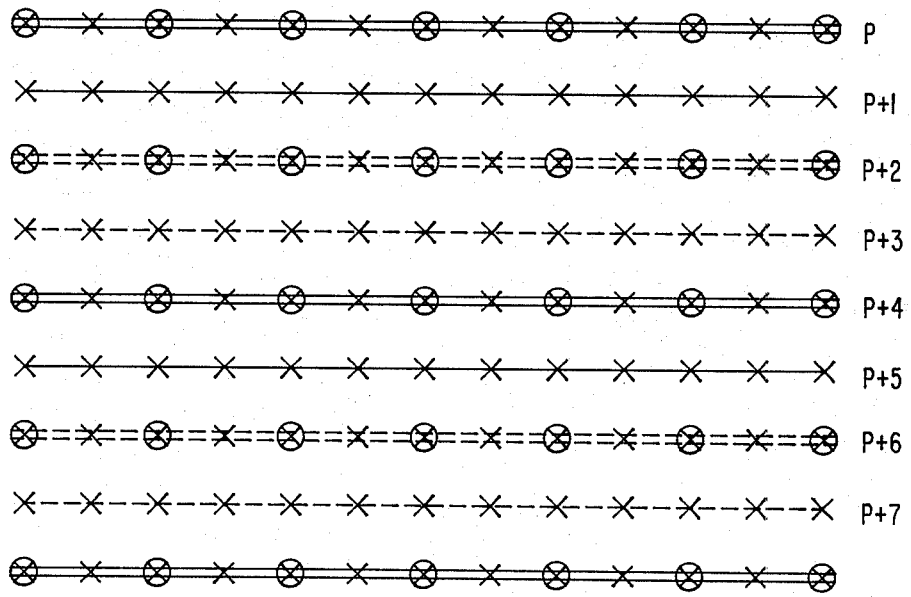

FIG. 6a illustrates the image sampling raster of a high-definition television system configured for compatibility with a standard definition receiver. Sub-raster scan lines p, p+2, p+4, p+6, . . . correspond to the standard definition raster with solid lines corresponding to odd fields and dashed lines corresponding to even fields. The pixels denoted by the circles form an orthogonal pattern for samples of a standef system occuring at an integral number of samples per line (at a sample frequency equal to an even integer multiple of one-half of the horizontal line-scan rate). The pixels denoted by "x" form the high definition television samples that occur on a high-definition raster having twice the horizontal and vertical resolution.

Figure 6B:
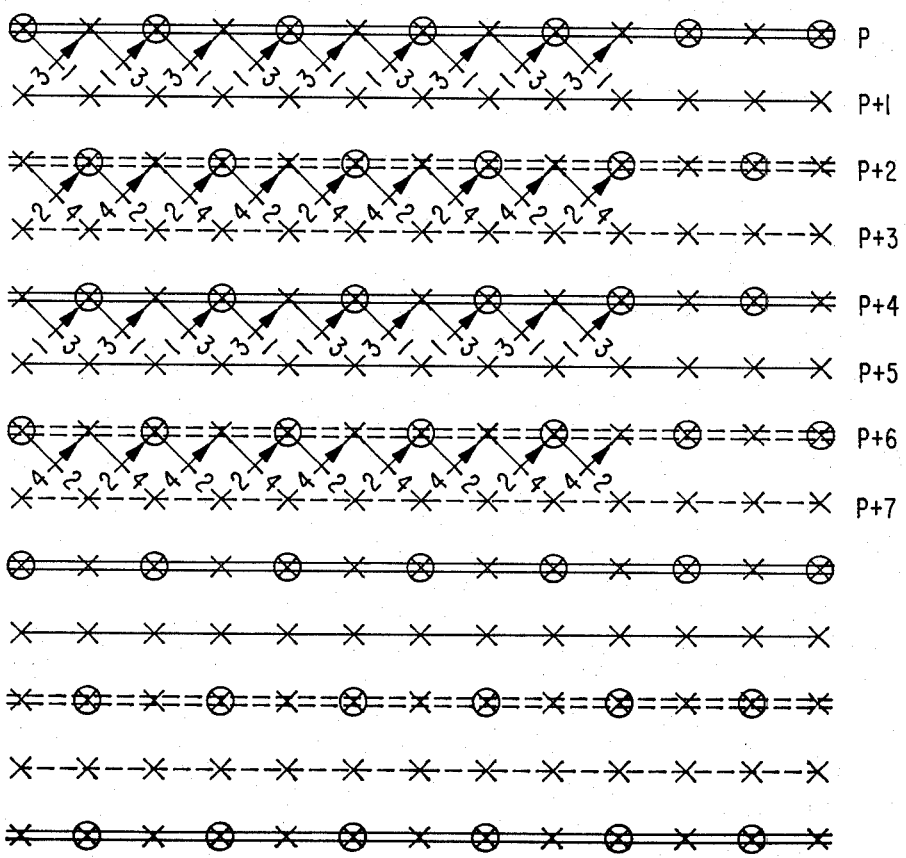
Figure 7:
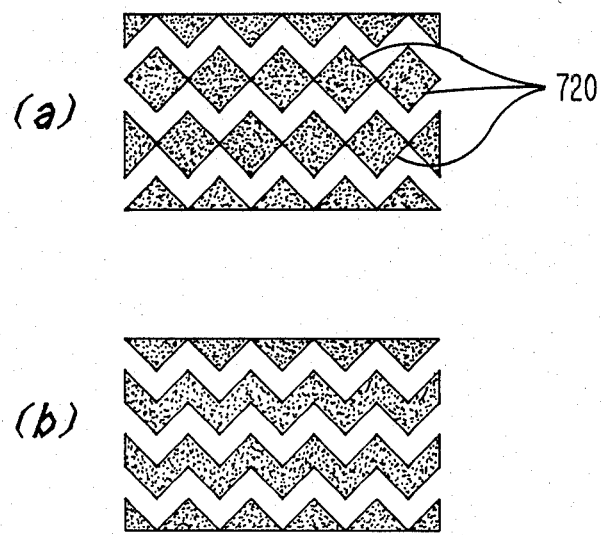
FIG. 7 illustrates the scanning pattern as viewed on a display in accordance with the various scanning techniques described herein.

FIG. 6b illustrates a high-definition television raster scanned in accordance with the aforementioned Hurst patent application wherein the scanning spot is wobbled at an odd integer multiple of one-half the horizontal line rate, i.e., $(2n-1) f_H/2$. The wobble scan according to Hurst is illustrated by the diagonal zig-zag lines 1, 2, 3, 4 to denote, respectively, the four-field sequence required to scan the complete high-definition television raster. The phase reversal of the wobble pattern on time-successive scan lines (p, p+2; p+4, p+6) is indicated. One problem associated with the Hurst wobble will be described with reference to FIG. 7a. FIG. 7a illustrates the scan line structure of the Hurst Application. Since the wobble phase on successive scans of a given field differs by 180° the scanning line structure will display a visible high-frequency modulation of the black space between lines shown as black diamond-shaped artifacts 720. The black artifacts 720 will appear to move in a diagonal manner on the image. This movement may be objectionable to a viewer.

Figure 6C:
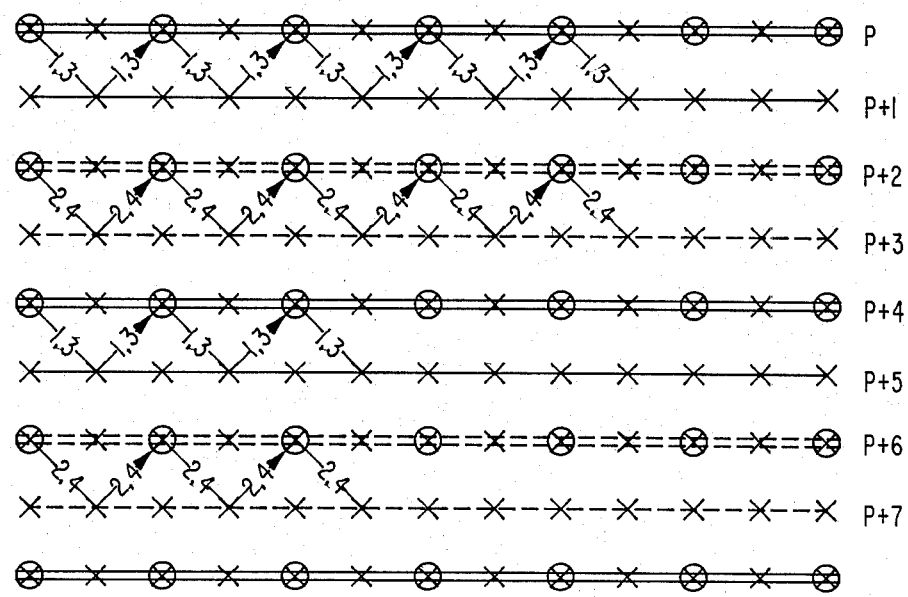

Referring to FIG. 6c, a wobble pattern is illustrated which is wobbled at an even integer multiple of one-half the horizontal line rate, i.e., $2n\ f_H/2$ to produce the herringbone pattern of lines 1, 2, 3, 4 to denote, respectively the four field sequence. One field of this pattern is illustrated in FIG. 7b. The black portion of the herringbone pattern is completely filled by the next following field thereby eliminating the moving array of black dots of FIG. 7c. As illustrated in FIG. 6c, however, the beam fails to scan all the pixels of the complete high-definition television raster.

Figure 6D:
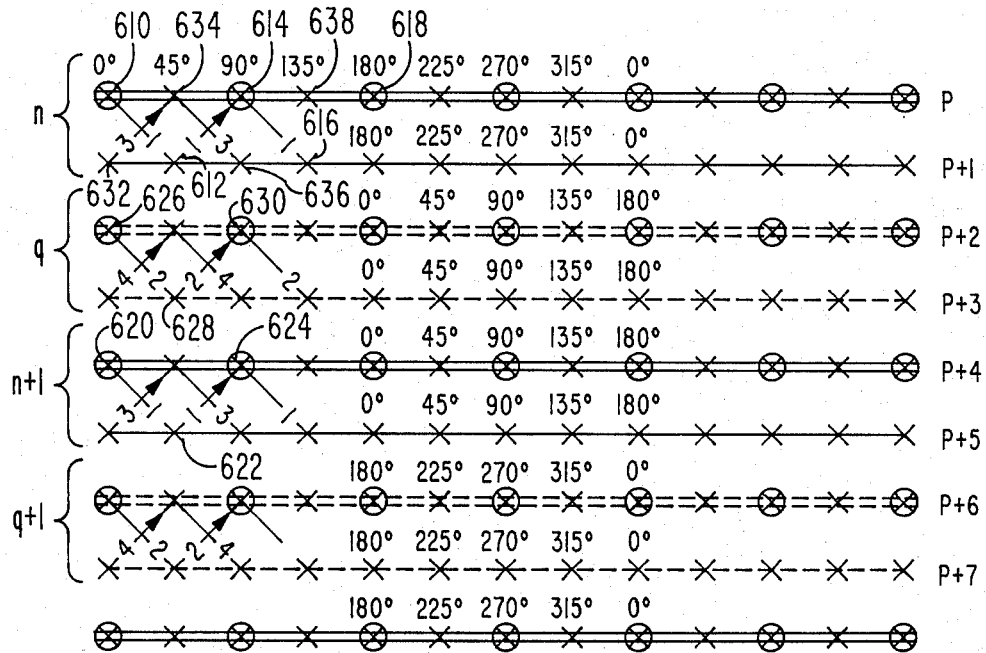

FIG. 6d illustrates a wobble pattern similar to that described in the aforementioned Hurst Patent Application for both eliminating the artifacts of FIG. 7a and scanning all the pixels of the high definition raster. In FIG. 6d, the wobble cycles occur in even integer multiples of one-half the horizontal line rate (i.e., at a rate $2n\ f_H/2$) so that the wobble pattern is in phase on time-successive lines (p, p+1; p+4, p+5 of field 1) in a field and in a frame (p+2, p+3; p+6, p+7 of field 2). To achieve dot interlace or full coverage of the high-definition television raster the wobble phase is inverted on alternate frames. Referring to FIG. 7b, the scanning line structure of an even multiple scan is shown. A herringbone pattern results from scanning in accordance with the present invention which is completely filled in during two full frames.

In FIG. 6d, the pixels 610, 612, 614, 616 are explored by the high-definition system of FIG. 4 in a first field at a wobble frequency of $4 \times f_{sc}$, giving a pixel sampling rate of $8 \times f_{sc}$ or $1,820 \times f_H$ in which $f_H$ is the horizontal line scan frequency and the integer 1,820 is selected to provide a sample frequency of eight times the chroma subcarrier. Thus, during the scan of the nth line of the 525 line raster of saticon 10, the wobble causes exploration of the pixels including, in order, pixels 610, 612, 614, 616, 618 . . . . It will be noted that the sinuous path described by the raster wobbling at an even integer multiple of one-half the line scanning frequency causes an in-phase condition on scan lines laid down in time sequence, as for example, the pattern of pixels 610, 612, 614 of the nth line is physically the same relative to the pattern of pixels 620, 622, 624 during the next scan (of line n+1). After the end of one field, a second interlaced field is scanned, and in due course pixels 626, 628, 630 of line q which is interlaced between lines n and n+1 are explored. During the first field of the next following frame, pixels 632, 634, 636, 638 . . . of line n are explored and then physically correspondingly pixels (not numbered) of lines n+1 and q. It will be noted that the second set of pixels being explored during the second frame constitute a completely different set of pixels of the 1,050 line high-definition raster. To provide full resolution of a raster being scanned at an even integer rate in accordance with the present invention, the phase of the wobble signal is inverted in alternate frames. If the wobble signal phase were not inverted pixels 632, 634, 636, 638 of line n would not be explored, as in FIG. 6c, instead pixels 610, 612, 614, 616 would be explored in every frame. By inverting the wobble signal phase on alternate frames one may achieve a full resolution image when an even integer multiple of one-half in line scan frequency is used.

Since the interlacing of the pixels of sub-raster lines n and q takes place on successive vertical scans, it follows that the 525 line scanning pattern of the camera must pass through two complete frames before every subpixel is explored. In this respect the wobbling signal has a characteristic similar to that of the color subcarrier, which is also at a frequency which is an odd integer multiple of one-half the line scanning frequency, and completion of a cycle of repetition requires a time duration of four fields. Consequently, the output signal of the camera is a representation of a high-definition picture, but the high-definition picture is generated at a 15 Hz rate corresponding to two frames, rather than a 30 Hz rate for one frame. Since the high-definition picture is effectively generated at half the rate of the standard picture, the bandwidth required to transmit the 4×resolution picture is only 8.4 MHz rather than 16.8 MHz for the 30 Hz high-definition picture. The interlaced subpixels recur at a 15 Hz rate, and consequently the 2:1 reduction in bandwidth is achieved at the expense of a 15 Hz sub-pixel flicker. Such small area flicker is not considered to be objectionable. Additionally, the subpixel flicker can be reduced or eliminated by the use of a frame store, as described herein.

As so far described, the high-definition camera of FIG. 4, which scans a 1,050 line raster consisting of two interlaced fields of 525 lines at a 30 Hz rate is completely display compatible with existing standard definition 525 line monitors. This compatibility results from the bandwidth limitation of a standard definition monitor to 4.2 MHz. With limited bandwidth, the monitor cannot resolve the subpixels generated by the sinuous subraster nor can it resolve the sinuous excursions, and so averages them. Since the scan rate is basically standard 525 lines scanning, the receiver or monitor will display a standard picture in spite of the fact that the high-definition information is embedded in the signal. A 15 Hz interpixel flicker on the standard definition 525 line display device may occur which results from the fact that the subpixels of successive scans may be different, and may be averaged differently on successive frames as displayed. This small area flicker is tolerable, especially since it is usually of small amplitude and also because the differences between adjacent subpixels which occasions the flicker occurs only in regions involving high-frequency transitions or fine detail of the picture.

Referring again to FIG. 4, an explanation of the phase reversal will be provided. To achieve the phase reversal of the wobble scan switch 27 and inverter 29 are provided. Switch 27 is operated at a rate equal to the frame rate or to one-half of the vertical field rate, $f_v/2$. In this manner the signal derived from generator 28 is coupled to auxiliary deflection winding 26 alternately via inverter 29 and conductor 31. Thus, the phase of the wobble signal is inverted at the frame rate.

FIG. 8 symbolically represents a compatible high-definition television system. A signal produced by high-definition camera 400 is the source of a signal for a standard definition monitor 710 which is limited to a bandwidth of 4.2 MHz by a symbolic low pass filter (LPF) 712 to produce a standard definition picture. A high-definition monitor 714 not so limited in bandwidth and properly arranged to decode the signal is used to produce a high-definition picture.

Figure 9:
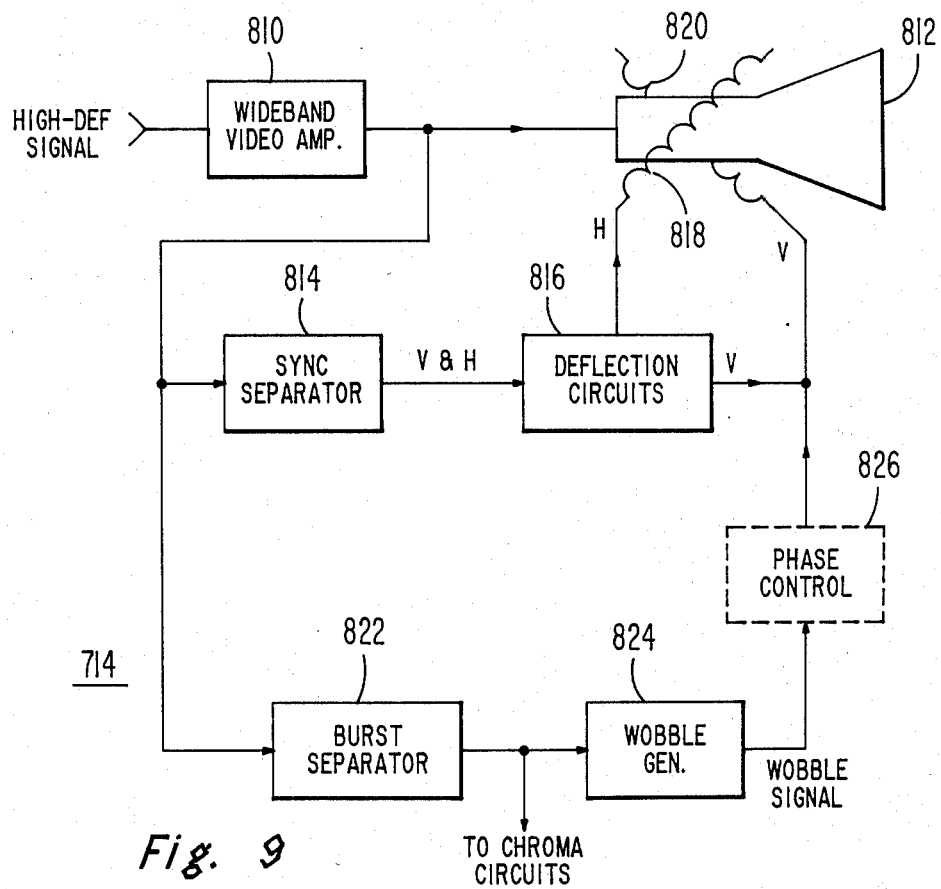
FIGS. 9 and 10 are simplified block diagrams of television monitors including scan wobble in accordance with the invention.

FIG. 9 illustrates in simplified block-diagram form the general structure of high-definition monitor 714. In FIG. 9, the high-definition signal is amplified by a wideband video amplifier 810 for application to the electrodes of a kinescope 812. A synchronizing signal separator 814 is coupled to the output terminal of amplifier 810 and separates vertical and horizontal sync signals from the composite signal for application to vertical and horizontal deflection circuits illustrated together as block 816. Horizontal deflection signals are applied from deflection circuits 816 to a horizontal deflection winding 818 associated with kinescope 812. Vertical deflection signals are similarly applied to a vertical deflection winding 820. A burst separator 822 is coupled to the output terminal of video amplifier 810 for generating a subcarrier signal related to the burst and applies the subcarrier to chroma circuits (not shown) and to a wobble signal generator 824 which generates a wobble signal at the correct rate (illustratively wobble signal generator provides a signal of approximately 14.3 MHz). The wobble signal so generated is combined with the vertical deflection signal for application to vertical deflection winding 820 so as to generate on display kinescope 812 a raster of 525 sinuous lines-per-frame at a 30 Hz rate. Amplifier 810 has sufficient bandwidth to prevent averaging of the subpixels and therefore the subpixels are reproduced at appropriate points on the sublines on the scanned raster to produce a high-definition image. A phase control circuit illustrated as block 826 may be coupled to the output of wobble generator 824 to control the phase of the wobble signal to provide synchronism between camera and receiver.

Figure 10:
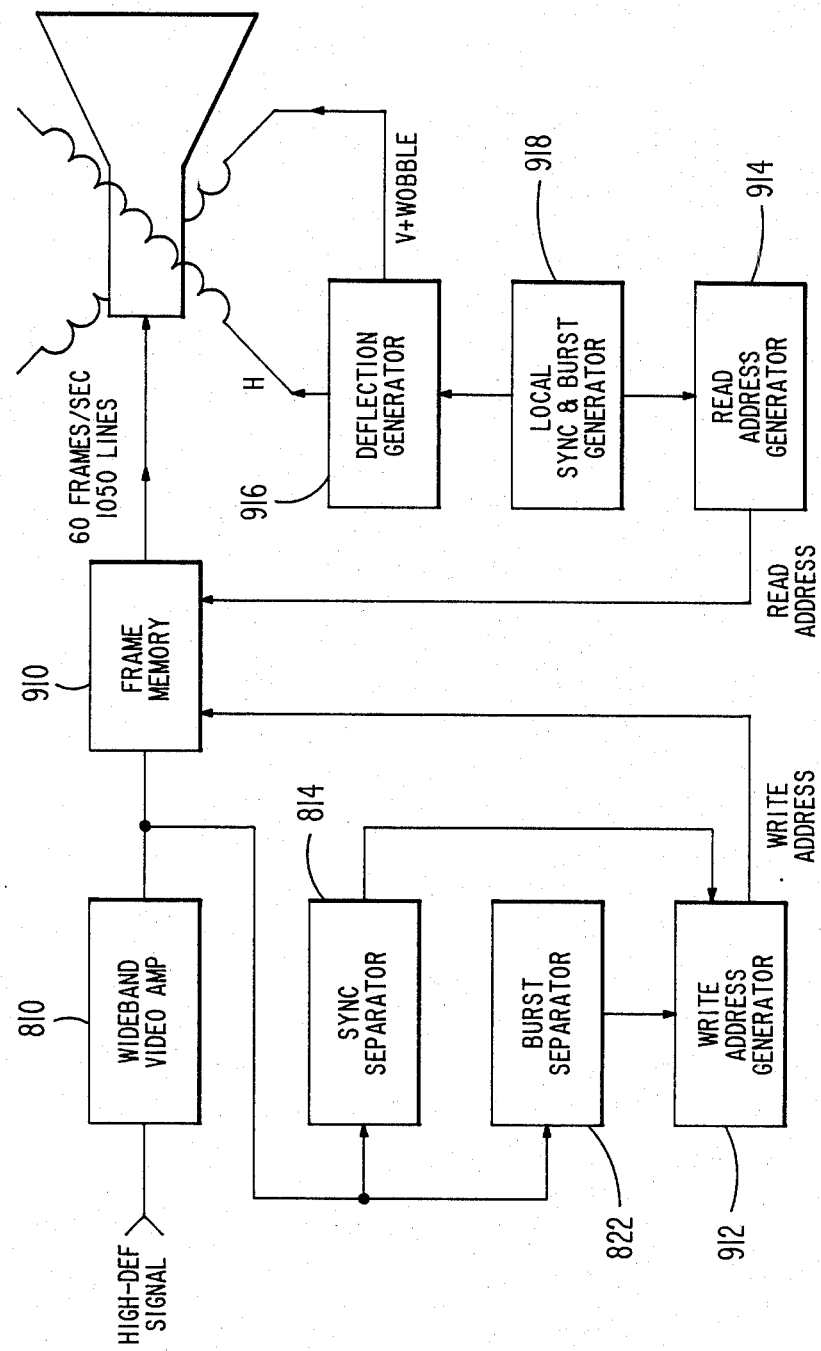

FIG. 10 illustrates in simplified block diagram form a high-definition television monitor similar to that of FIG. 9 but including a 1,050 line frame memory 910 and associated WRITE address generator 912 and READ address generator 914. This arrangement eliminates subpixel flicker by storing a high-definition frame of 1,050 lines, corresponding to the high-definition information in four NTSC fields. The information is stored at the rate of the incoming signal by controlling WRITE address generator 912 with the aid of a signal derived from burst separator 822. On the READ side, a local sync generator 918 determines the reading rate. This reading rate can be independent of and higher than the incoming signal rate and can provide the advantage of a progressive or noninterlaced scan. The advantages of a progressive scan in reducing the visibility of scan lines are described in detail in U.S. patent application Ser. No. 300,227 filed Sept. 1, 1981, in the name of K. H. Powers which issued Aug. 23, 1983, as U.S. Pat. No. 4,400,719.

As mentioned above, the high-definition signals of the arrangement of FIG. 10 with a READ rate double the WRITE rate produces a high-definition signal at the display with an effective frequency range extending up to 16.8 MHz, in spite of the effective reduction from the 16 MHz which would have been required if the high-definition signal were generated at the 30 Hz rate rather than at the 15 Hz rate. It is clear that such a signal cannot be made compatible with a standard NTSC broadcast signal because the 8.4 MHz signal bandwidth exceeds the 4.2 MHz luminance bandwidth available for standard definition systems.

Figure 11:
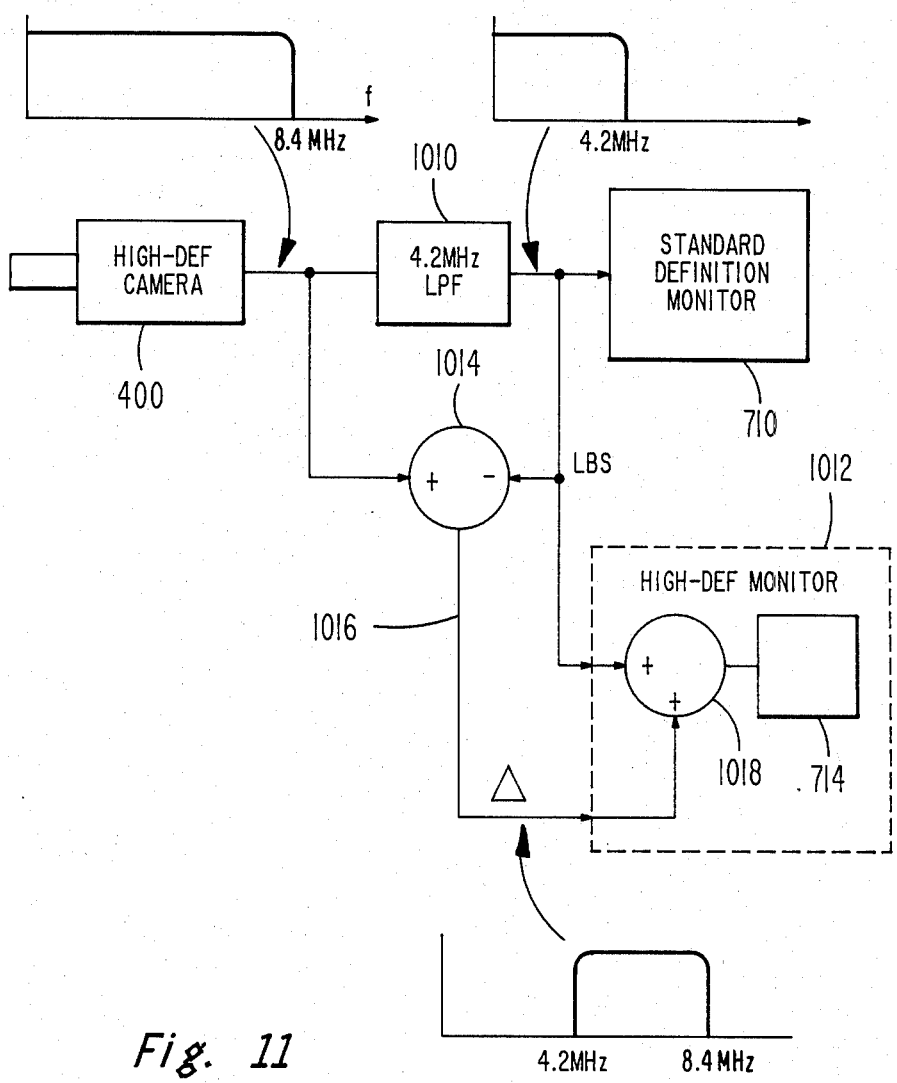
FIG. 11 is a simplified block diagram of a compatible high-definition television system according to the invention.

FIG. 11 illustrates an arrangement by which a standard definition monitor can receive a luminance signal having a standard 4.2 MHz bandwidth while a high-definition monitor receives signals representative of the high-definition information. In FIG. 11, high-definition camera 400 produces a baseband signal having an effective frequency bandwidth extending to 8.4 MHz. The signal is applied through a 4.2 MHz low pass filter 1010 to a standard definition monitor 710. Thus, the high-frequency or high-definition portion of the information generated by camera 400 is removed by filter 1010 before application to a standard definition monitor 710. The limited bandwidth signal is also applied to a first input terminal of a high-definition monitor 1012. A differencing circuit 1014 subtracts the limited bandwidth signal at the output of filter 1010 from the full bandwidth signal at the input of the filter to produce a difference signal having a bandwidth extending from 4.2 MHz to 8.4 MHz. This signal represents the high-definition portions of the signal and the arrangement of filter 1010 and the differencing circuit 1014 acts as a high-pass filter. The difference signal is applied to a second input of high-definition monitor 1012. Within monitor 1012, a summing circuit 1018 receives the limited bandwidth signal and the difference signal and adds them together to regenerate the high-definition signal which is applied to monitor 714 to produce the high-definition signal.

In the arrangement of FIG. 11, the high-definition signal is broken into two elements, the first element being a limited bandwidth signal which can be applied through a conventional 4.2 MHz luminance channel to a standard definition monitor and to a high-definition monitor. Further, a difference signal representative of the high-definition vertical and horizontal portions of the signal is carried to the high-definition monitor along a second channel illustrated as conductor 1016.

In the development of NTSC color television, the psychophysical properties of the human eye were considered and a marked reduction in the bandwidth required to accomplish color television transmission was achieved by taking advantage of the inability of the eye to perceive fine detail in color. In an analagous manner, another pyschophysical property of sight is used to reduce the bandwidth necessary for transmission of a high-definition signal. The analagous characteristic of the eye which permits bandwidth reduction for high-definition television is the inability of the eye to resolve detail in moving objects. In effect, this means that a high-definition system is not required to provide high-definition when the objects in the scene are in motion. Also, it is well known that a motionless picture may be transmitted through a very narrow bandwidth, if sufficient time is provided in the initial transmission. If a frame store is available at the receiver, the transmitter may simply compare the picture just sent with the next following picture, and if there is no change, send only a single bit which instructs the receiver to repeat the frame currently being displayed. Thus, a motionless picture in principle requires little bandwidth for its transmission. In principle, therefore, a television system does not require wide bandwidth whenever the scene is in motion or the scene is not in motion. The arrangements of FIGS. 4–11 describe a means for generating a high-definition picture in which the high-definition components include portions attributable to both vertical and horizontal directions.

For a description of a system which may be used for transmitting and receiving a high-definition television system over a limited bandwidth channel reference may be made to the aforementioned Hurst application, U.S. patent application Ser. No. 352,001. In that application a transmitter is described for receiving high-definition luminance signals and chrominance and synchronizing signals and for generating a compatible signal for transmission over a limited bandwidth channel. In this system, the high-definition components of the still portions of the picture are concealed within the vertical and horizontal blanking intervals. Further, Hurst describes a high-definition television receiver suitable for receiving the high-definition signals transmitted in such a fashion.

Figure 12:
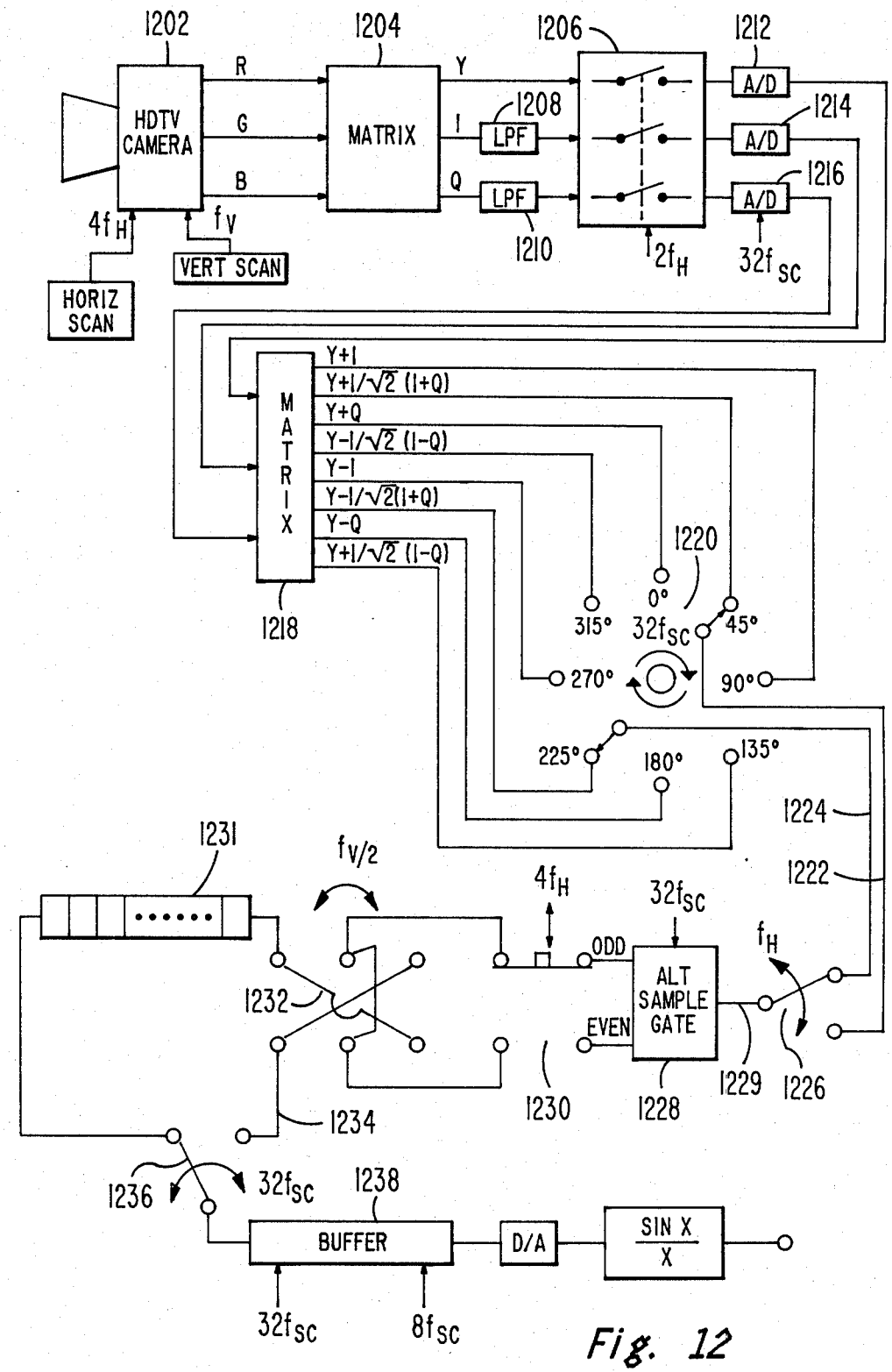
FIG. 12 illustrates, partially via block diagram form, salient portions of a high-definition video encoder arranged in accordance with the invention.
Figure 13A:
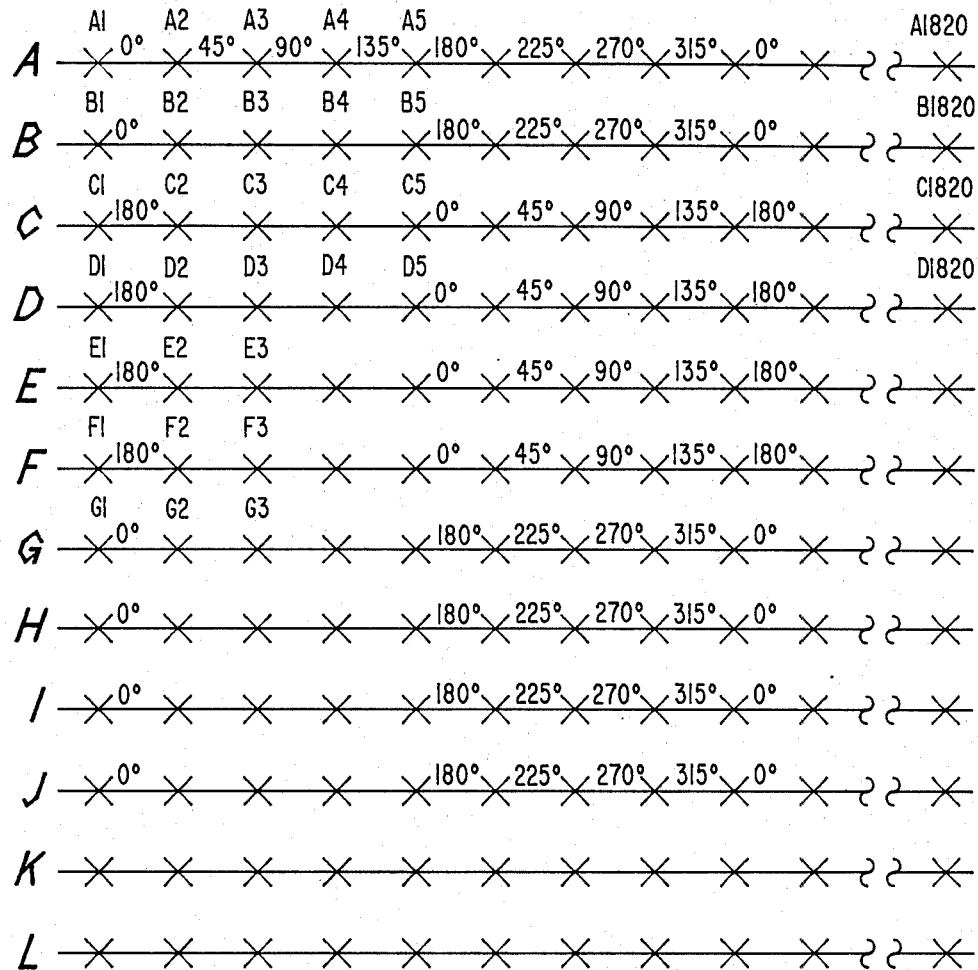
FIGS. 13a+13b illustrate a high-definition raster linearly scanned in accordance with the principles of the present invention.
Figure 13B:
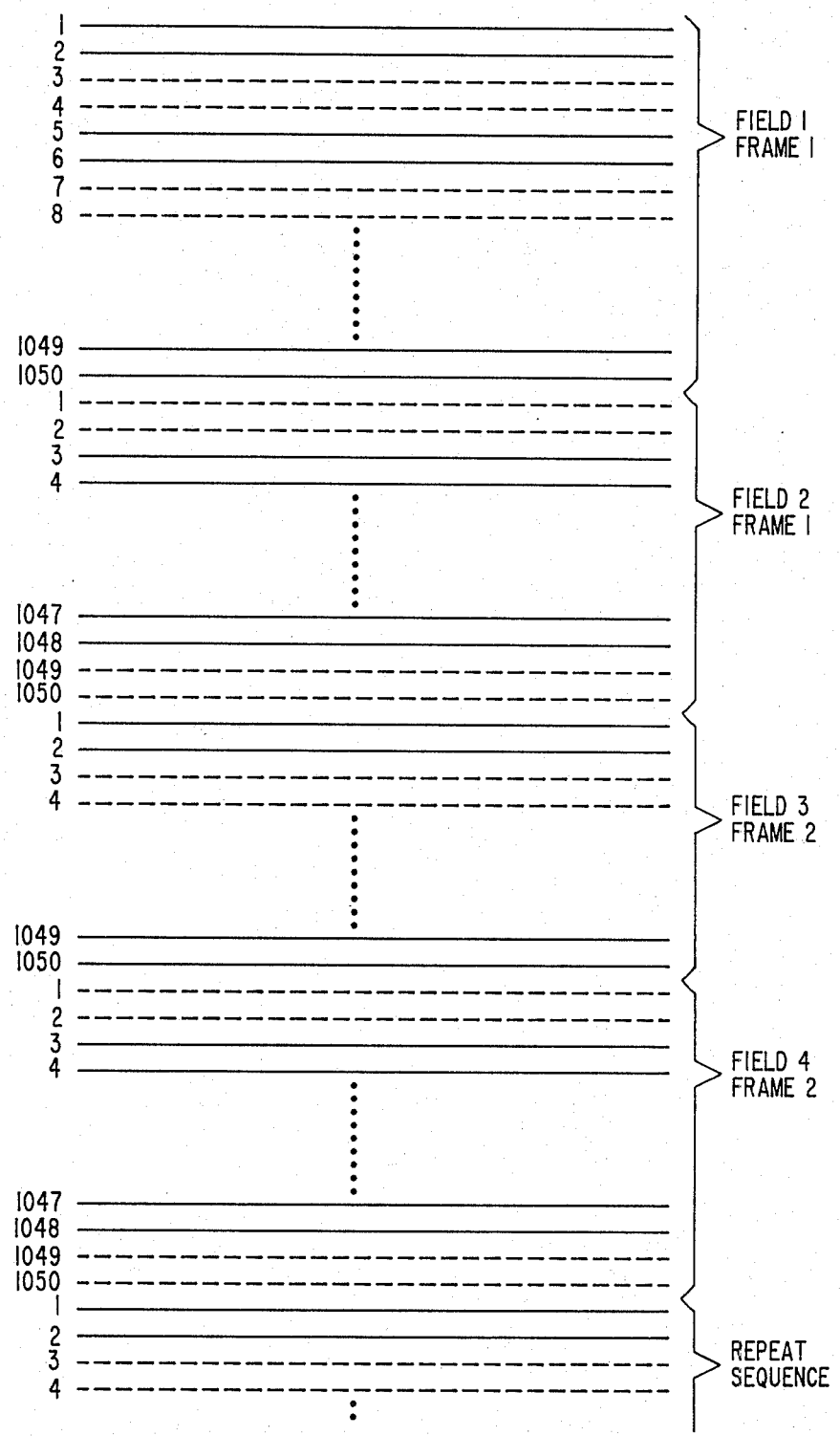
Figure 14:
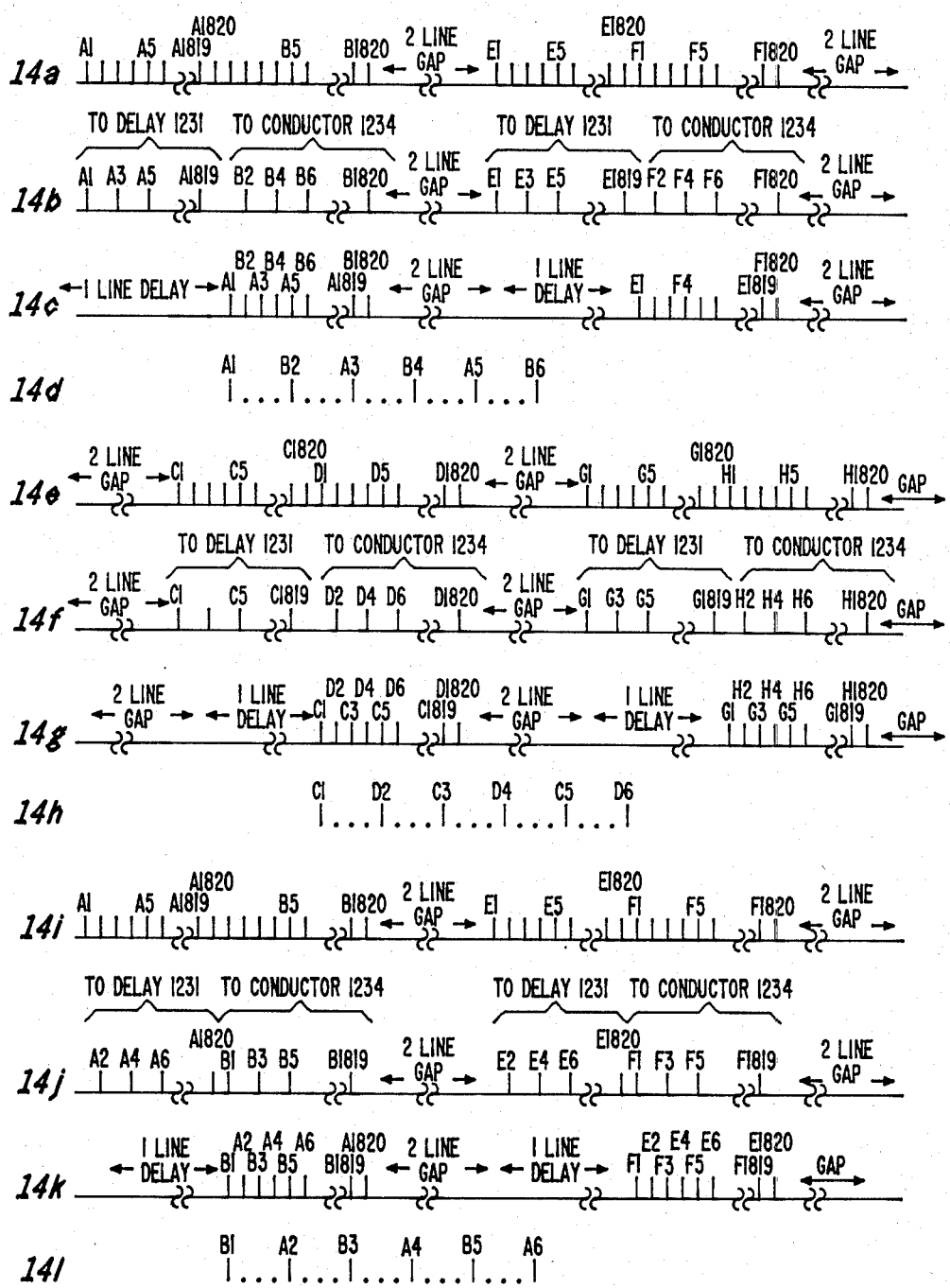
FIG. 14 illustrates a timing diagram for use in explaining the operation of FIG. 12.
Figure 15:
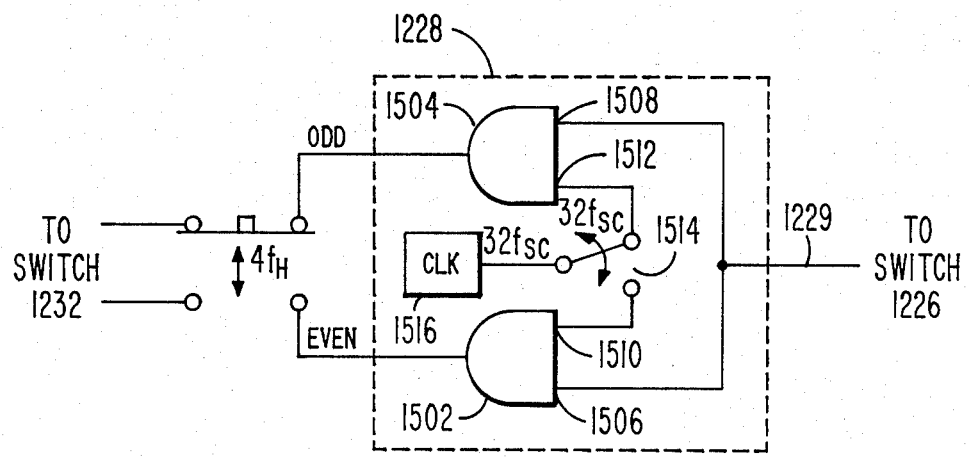
FIG. 15 shows an embodiment of the alternate sample gate of FIG. 12.

FIG. 12 illustrates, partially via block diagram form, a high-definition color television generating system that provides a composite wobble scan signal from digital processing of a progressively scanned camera signal wherein the horizontal scanning is performed in a linear manner utilizing a single line store to effect wobbling. FIGS. 13–15 will be used to explain the operation of the high definition system of FIG. 12. Referring to FIG. 13a, a portion of the raster of high-definition television camera 1202 is shown having pixels A1 through A1820 in subraster row or line A, B1 through B1820 in subraster row B, etc. High-definition television camera 1202 is operated to scan horizontally at a rate of four times the horizontal line rate of a standard definition camera (i.e., $4f_H$) to scan 1,050 scan lines per field and vertically at a rate equal to that of a standard definition camera (i.e., $f_v$). The R, G and B signal outputs of camera 1202 are matrixed in matrix 1204 to form Y, I and Q signals in the usual manner. These signals are fed through gate (alternate line pair gate) 1206 which is clocked at a rate equal to one-half of the horizontal scan rate of camera 1202 (i.e., $f_H$) to pass alternate line pairs, i.e., signals from lines 1, 2, 5, 6, 9, 10, etc. of the continuous four field raster of FIG. 13b during fields 1, 3 and other odd fields. In FIG. 13b solid lines represent lines transmitted through gate 1206 whereas dashed lines represent lines blocked from transmission. During the vertical scan of field 2 and successive even fields, gate 1206 passes lines 3, 4, 7, 8, 11, 12, etc. of the continuous four field raster of FIG. 13b. The I and Q signals are low pass filtered in low pass filters 1208, 1210, respectively, to about one-quarter (illustratively, 8 MHz) of that of the Y signal, illustratively, on the order of 32 MHz. Because of the high speed scanning the R, G and B signals, as well as Y, I and Q signals, have bandwidths of eight times that of a standard definition signal (NTSC) even though existing only 50% of the time-eight times the standard rate comes from the fact that the horizontal scan rate is four times that of standard definition and the high-definition signal has twice the resolution (high-frequency content) as that of the standard definition signal. Thus, to sample Y, I and Q at the equivalent rate of four times the chroma subcarrier (i.e., $4f_{sc}$) the sample rate must be at 32 times the chroma subcarrier (i.e., $32f_{sc}$).

The Y, I and Q signals are converted from analog to digital in analog-to-digital converters 1212, 1214 and 1216. Since the sample rate is at $32f_{sc}$ the analog to digital converters must operate at that rate. To achieve this high speed analog-to-digital converters 1212, 1214 and 1216 may be implemented by using a plurality of analog-to-digital converters for each of the blocks 1212, 1214 and 1216 and multiplexing the data to operate at the high data rate.

FIG. 14 is a timing diagram showing samples of the high-definition system of FIG. 12. Timing signals 14a, 14e and 14i represent the output of analog-to-digital converter 1212 wherein two line gaps are created in the timing sequence by gate 1206 which passes alternate line pairs.

Encoding a composite signal at the signal source by digital means is aided by sampling at an integer multiple of the color subcarrier, e.g., $4f_{sc}$. Referring again to FIG. 13a, the phase values indicated at each subpixel correspond to wobbling at the $4f_{sc}$ rate and high-definition sampling at $8f_{sc}$. The phase values indicated on FIG. 13a of the high-definition television subpixels are those values that must be assigned to guarantee compatibility with the standard definition receiver that will filter out the high-frequency components above the standard definition bandwidth (i.e, 4.2 Mz).

To effect the correct phase values the sampled Y, I and Q signals are combined in composite matrix 1218 to form the signals Y+Q, Y+1√2 (I+Q), Y+I, Y+1√2 (I−Q), Y−Q, Y−1√2 (I+Q), Y−I and Y−1√2 (I−Q) representative of samples occurring at 0°, 45°, 90°, . . . , 315° phase positions of the color subcarrier $f_{sc}$, respectively. The matrixed output signals occurring at the rate of $32f_{sc}$ are selected in sequence by selector switch 1220 that steps at the $32f_{sc}$ rate providing two output signals on conductors 1222 and 1224 differing by 180° of subcarrier phase. These signals consist of samples derived from alternate line pairs, which lines occur at a rate of four times the standard-definition line rate (i.e., $4f_H$), with time gaps during the missing alternate line pairs. Switch 1226 operates at the standard definition horizontal line rate (i.e., $f_H$) to invert the color subcarrier on every fourth HDTV line corresponding to alternate lines of standef TV. For example, in FIG. 13a the phase of the samples is inverted between lines B and C and between F and G.

Alternate samples are gated by gate 1228 to switch odd samples, i.e., A1, A3, A5, . . . , B1, B3, B5, . . . , C1, C3, C5, . . . , D1, D3, D5, . . . to one (odd output from gate 1228 and even samples A2, A4, A6, . . . , B2, B4, B6, . . . , C2, C4, C6, . . . , D2, D4, D6, . . . to the other (even) output of gate 1228. In other words, the signals gated by gate 1228 are delivered to switch 1230 which operates at four times the horizontal rate or equal to the rate that the camera scans in the horizontal direction. Double pole, double throw switch 1232 operates at one-half of the vertical rate (i.e., $f_v/2$). Switch 1232 provides the polarity reversal on alternate frames necessary to effect full resolution in accordance with the teachings of the present invention. The output of delay 1231 and conductor 1234 are switched by switch 1236 (illustratively operating at $32f_{sc}$) such that samples are selected alternately from delay 1231 and conductor 1234 to intermingle in a wobble fashion the pixels of the subraster of FIG. 13a in accordance with the wobble described herein.

The operation of gate 1228, switch 1230, switch 1232, delay line 1231 and switch 1236 will be explained with reference to FIGS. 13–15. In FIG. 15, AND gates 1502, 1504 have one of their respective inputs 1506, 1508 connected to input conductor 1229. Inputs 1510, 1512 of AND gates 1502, 1505, respectively, are coupled via switch 1514 to clock 1516 operating at $32f_{sc}$. Switch 1514 is operated at one-half of the rate of clock 1516 to alternatively enable AND gates 1502, 1504. In operation, samples from switch 1226 shown in timing diagram 14a are alternatively switched to the outputs of AND gates 1502, 1504 such that odd samples are clocked through to the output of AND gate 1504 for delivery to one input of switch 1232 and even samples are clocked through to the output of AND gate 1502 for delivery to the other input of switch 1232. Thus, with switch 1232 connecting odd samples to delay 1231 in field one of frame one (i.e., switch 1232 thrown to the left) of any scanning sequence odd pixels of odd lines, e.g., A1, A3, etc. are switched via switch 1230, 1232 to delay line 1231 and even pixles of even lines, e.g., B2, B4, etc. are switched via switches 1230, 1232 to conductor 1234. Timing diagram 14b shows the sample sequence going to delay 1231 or conductor 1234. Switch 1236 operates to intermingle the samples from delay 1231 and conductor 1234 such that the even samples are interposed between odd samples as shown in timing diagram 14c.

For the next field, i.e., field two, frame one, odd samples from lines C, G, etc. are switched to delay 1231 and even samples from lines D, H, etc. are switched to conductor 1234 (see timing diagram 14f). Switch 1236 switches such that the even samples, i.e., D2, D4, . . . , D1820, etc. are intermingled between the odd samples, i.e., C1, C3, . . . , C 1819, etc. to create a wobble scan effect as shown in timing diagram 14g.

For the next field which is the first field of frame two switch 1232 is thrown to the right such that even samples are passed through delay 1231 and odd samples are passed to conductor 1234. Thus, even samples from lines A, E, etc. are switched to delay 1231 and odd samples from lines B, F, etc. are switched to conductor 1234 (see timing diagram 14j). Switch 1236 switches the samples such that the even samples, i.e., A2, A4, A6, are intermingled between the odd samples, i.e., B1, B3, B5, . . . , B 1819 to create the wobble scan effect shown in timing diagram 14k. These alternate samples from adjacent intermingled lines are passed through a first-in-first-out (FIFO) buffer 1238. Buffer 1238 may be a delay line having space to store one line of data (i.e., 1820 samples). The data is clocked into buffer 1238 at a $32f_{sc}$ rate and clocked out at a rate of one-fourth of the input rate or at an $8f_{sc}$ rate. This variation in the rates of clocking data into and out of buffer 1238 removes the gaps that were introduced by gate 1206 wherein alternate line pairs of alternate fields were gated plus the gaps introduced by delay 1231. Timing diagrams 14d, 14h and 141 show the slowed down samples clocked out of FIFO buffer 1238 without gaps. These samples (the output of buffer 1238) represent the composite wobble signal. The digital signal from buffer 1238 is converted to analog in the digital-to-analog converter 1242, equalized in filter 1242 having a sin x/x impulse response. The filtered signal may be transmitted as an analog high-definition television composite wobble scan signal in accordance with the aforementioned Hurst technique. Advantageously, this wobble signal is compatible with standard definition receivers.

Figure 16:
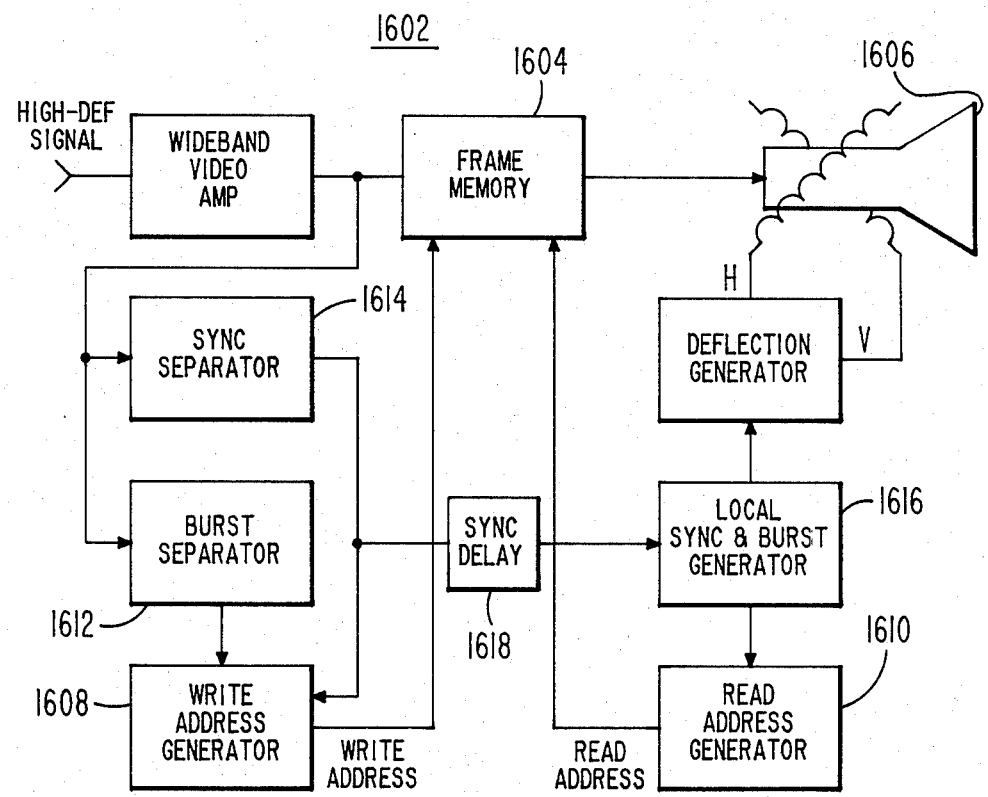
FIG. 16 is a simplified block diagram of a progresively scanned television monitor.

To assure that in a high-resolution display, the quality is not marred by scan structure artifacts compounded by spot wobble, a line-scan television monitor 1602 is described with reference to FIG. 16. In the monitor of FIG. 16 a progressively scanned horizontal line raster 1606 wherein a picture is displayed having full resolution in every display field is provided. In this system each pixel transmitted in the wobble pattern is accumulated in its proper position in random access frame memory 1604 until a complete high-definition television frame (i.e., four NTSC fields) is ready for progressive display. Frame memory 1604 is a 1050-line memory. Associated with frame memory 1604 are WRITE address generator 1608 and READ address generator 1610. This arrangement eliminates subpixel flicker by storing a high-definition frame of 1050 lines. The information is stored in its proper position at the rate of the incoming signal by controlling WRITE address generator 1608 with the aid of a signal derived from burst separator 1612 and sync separator 1614. On the read side, a local sync generator 1616 determines the reading rate and controls the deflection generator. The reading rate could in principle be independent of the incoming signal rate and can provide the advantage of progressive (i.e., non-interlaced) scan, but normally the reading rate would be synchronized with the writing rate through delay 1618. Illustratively, the delay is such that at least three fields are written in frame memory 1604 to allow the first two lines of FIG. 6d to be filled. Maximum high-definition television picture quality would also be achieved if the high-definition color components were transmitted separately from the luminance, but to achieve full color compatibility with NTSC receivers, the standard definition color must be encoded on a 3.58 MHz subcarrier, implying composite transmission.

Figure 17:
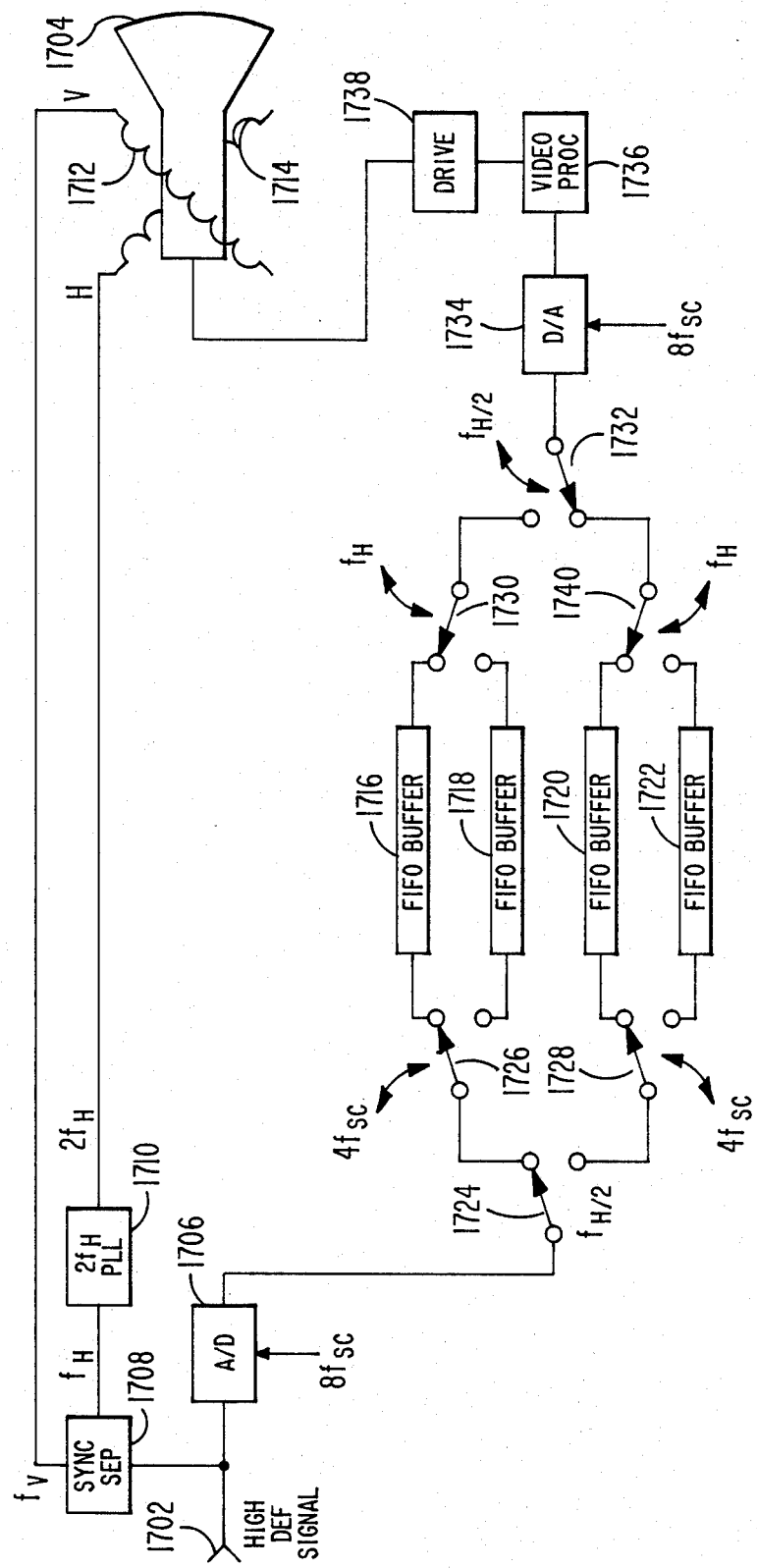
FIG. 17 illustrates, in block diagram form, a high definition television receiver using line stores, in accordance with the principles of the present invention.

A high resolution television receiver using line stores instead of a frame store is illustrated in FIG. 17. The high resolution receiver of FIG. 17 is arranged to scan at twice the standard definition horizontal frequency, at 31.5 KHz in the case of NTSC. In the receiver of FIG. 17 a high-definition signal in a wobble format is received at terminal 1702. A high-definition kinescope 1704 displays, in a linear manner, the high definition signal received at terminal 1702. In accordance with FIG. 17 the display is scanned vertically at the standard definition rate and horizontally at twice the standard definition rate, i.e, $2f_H$. The high definition signal at terminal 1702 is delivered simultaneously to analog-to-digital converter 1706 and sync separator 1708. Sync separator 1708 coupled to terminal 1702 separates vertical and horizontal synchronizing signals. The horizontal synchronizing signals are applied to a $2f_H$ phase lock loop 1710 for producing a drive signal at twice the standard definition horizontal rate, i.e., $2f_H$. The vertical drive signal from separator 1708 (containing means for effecting vertical scanning in such a manner that lines are laid down in alternate line pairs with spaces between the pairs to allow for the alternate line pairs in the next field) is applied to vertical deflection winding 1712 associated with kinescope 1704. The twice horizontal drive signal is applied to horizontal deflection winding 1714 at 31.5 KHz. At 31.5 KHz each scan across the face of kinescope 1714 occurs in $\tfrac{1}{2}f_H$ time period.

The input signal is in the form of the signal transmitted by the transmitter of FIG. 12 wherein the odd samples from one high-definition television line are intermingled with the even samples from an adjacent high-definition television line. FIFO buffers 1716–1722 are used to separate alternate time successive samples which are arranged in one line of a wobble scan signal into two lines of a high-definition line scan. These two lines may be displayed in a line scan format on a high-definition display such as the display of kinescope 1704. Illustratively, buffers 1716–1722 are 910 sample first-in-first-out rubber buffers. The operation of the system is as follows. Analog-to-digital converter 1706 samples the incoming signal at the high definition rate, i.e., $8f_{sc}$, which is the rate at which the samples are transmitted by the transmitter of FIG. 12. Switch 1724 switches at one-half of the standard definition line rate, i.e., $f_{H/2}$, to load alternate incoming horizontal lines into buffers 1716, 1718 and buffers 1720, 1722, respectively. Switch 1726 switches at a four times subcarrier rate, $4f_{sc}$, to switch alternate time successive samples into buffers 1716, 1718, respectively. For example, referring to FIG. 13a, when the first line of field one, frame one of a high-definition signal is received the odd samples of line A, e.g., A1, A3, A5, etc. are switched into buffer 1716 while the even samples of line B, e.g., B2, B4, B6, etc. are switched into buffer 1718. When buffers 1716, 1718 are filled the signal is switched out of buffer 1716 to write, in the example given, the odd samples of the A line. The next line, i.e., B line, is written from buffer 1718 after buffer 1716 is emptied. While buffers 1716 and 1718 are being read out the signal from the next line is stored in buffer 1720, 1722, respectively, via switches 1724 and 1728. For this example, referring to FIG. 13a, the second line of field one, frame one contains the odd samples from line E and the even samples from line F. Switch 1728, like switch 1726, operates at four times the subcarrier, $4f_{sc}$, to switch the alternate time successive samples into buffers 1720, 1722, respectively.

On the read side, the signal from buffers 1716, 1718 are transmitted via switch 1730 operating at the horizontal rate, $f_H$, and switch 1732 operating at one-half of the horizontal rate, $f_{H/2}$, to digital-to-analog converter 1734, operating at $8f_{sc}$, wherein the signals are converted to analog form for display on kinescope 1704. The analog signal from digital-to-analog converter 1734 is processed in video processing unit 1736 and applied to kinescope driver 1738 for display on kinescope 1704 at twice the standard definition horizontal rate. Switch 1740 operates in a manner similar to switch 1730 to gate alternate lines of a high definition signal via elements 1732, 1734, 1736, 1738 for display on kinescope 1704. Switch 1732 is switched out-of-phase with switch 1724 so that during the time period in which lines are being written into one pair of buffers the signal may be read out of the other pair of buffers. For example with respect to frame 1, field 1 of the earlier example line E and F are written into buffers 1720 and 1722 while lines A and B of frame 1, field 1 are being read out of buffers 1716 and 1718. In the next sequence the signals are read out of buffers 1720 and 1722 while buffers 1716 and 1718 are being filled. FIG. 17 illustrates a line scan display system for displaying a high-definition video signal which has been transmitted in wobble fashion. In accordance with this system a high-definition display may be implemented with four line buffers of 910 samples each or two line buffers of 1810 samples each. It should be noted that it takes four fields in the system of FIG. 17 to display a complete high-definition television image.

Other embodiments of the invention will be apparent to those skilled in the art. It will be obvious that analog equivalents of functions described in digital terms may be used. Progressive or interlaced scanning may be used or digital equivalence of functions described in analog embodiments may be used.

What is claimed is:

1. In a high-definition television system compatible with a television receiver having capability of operating in respsonse to a limited-bandwidth signal, said system being used to display an image in a linear manner or in a wobble manner wherein said image is scanned in a wobble fashion, the system comprising:
   scanning means for scanning an image at a first predetermined rate in a first direction and at a second predetermined rate in a second direction orthogonal to said first direction;
   selecting means for selecting non-adjacent time successive picture elements scanned in said first direction, said picture elements being selected from non-adjacent positions in said second direction, said selecting means in combination with said scanning means effecting a wobble scanning of said image such that said image is sub-scanned in said second direcion at a third rate, which is an integer multiple of one-half of said first predetermined rate, greater than said first rate, thereby producing a high resolution scan in said first and second directions, whereby when said integer is chosen to be a first predetermined integer, unscanned regions of a given field of said image observed on a display scanned in said wobble manner are not overlaid by scanned regions of a field which is successive in time to said given field thereby creating visible patterns which tend to be objectionable, wherein said integer is chosen to be a second predetermined integer, said second predetermined integer affecting said image observed in a display scanned in said wobble manner such that said image lacks full resolution; and
   inverter means for switching said selecting means at one-half of said second predetermined rate such that said selecting means selects alternate non-adjacent, time successive picture elements scanned in said first direction to effect full resolution of said display.

2. The system according to claim 1 wherein said first direction is in a horizontal direction.

3. The system according to claim 2 wherein said second direction is in a vertical direction.

4. The system according to claim 3 wherein said first predetermined rate is at 15.7 KHz.

5. The system according to claim 4 wherein said second predetermined rate is approximately 60 Hz.

6. In a high-definition television system compatible with a television receiver having capability of operating in response to a limited-bandwidth signal, the system comprising:
   scanning means for scanning an image at a first predetermined rate in a first direction and at a second predetermined rate in a second direction orthogonal to said first direction;
   wobble means for providing a signal to wobble said scan such that sub-scanning occurs in a direction transverse to said first direction, said signal from said wobble means varying at a third rate equal to an even integer multiple of one-half of said first predetermined rate such that said image is scanned with less than full resolution; and
   inverter means for inverting the phase of said signal provided by said wobble means at one-half of said second predetermined rate to effect full resolution of said image.

7. The system according to claim 6 wherein said first direction is in a horizontal direction.

8. The system according to claim 7 wherein said second direction is in a vertical direction.

9. In a high-definition television system compatible with a television receiver having capability of operating in response to a limited-bandwidth signal, the system comprising:
   scanning means for horizontally scanning a display with an electron beam at a first predetermined rate, said electron beam sweeping across said display vertically at a second predetermined rate less than said first predetermined rate;
   wobble means for providing a signal to sinusoidally dither said electron beam such that said electron beam scans simultaneously in a direction transverse to said horizontal scanning direction, the rate of said sinusoidal dithering being an even integer multiple of one-half of said first predetermined rate such that said electron beam scans said display with less than full resolution; and
   inverter means for inverting the phase of said signal provided by said wobble means at one-half of said second predetermined rate to effect full resolution of said display.

10. The system according to claims 6 or 9 wherein said predetermined rate is at 15.7 KHz.

11. The system according to claim 10 wherein said predetermined rate is approximately 60 Hz.

12. The system according to claims 6 or 9 wherein said even integer is chosen to be 910.

13. The system according to claim 12 wherein said first predetermined rate is 15.7 KHz and wherein said second predetermined rate is 60 Hz.

14. An arrangement for transmitting high-definition television signals comprising:
   scanning means for scanning an image at a first rate in a first direction in a line scan;
   a source, responsive to said scanning means, of high-definition signals representative of said image;
   first gating means for gating alternate pairs of lines scanned by said scanning means;
   matrixing means for switching said high-definition signals, said matrixing means providing first and second signals representative of first and second phases of said high-definition signals respectively;
   switching means for alternately switching between said first and second signals at a fraction of said first rate;

second gating means for gating alternate samples of signals alternately switched by said switching means; and interleaving means for interleaving first alternate samples of signals gated by said second gating means from a first scan line with second alternate samples of signals gated by said gating means from a second scan line.

15. The arrangement according to claim 14 wherein said interleaving means comprises first and second signal paths from said second gating means to an output terminal, said first signal path including a delay line having a signal delay for delaying said first alternate samples.

16. An arrangement for displaying high-definition television signals on a display of a high-definition television receiver, said system being used to display an image in a linear fashion wherein said image is transmitted in a wobble manner, comprising:

first switch means for switching alternate samples of a wobble scan signal;

first buffer means, coupled to said first switch means, for storing a first set of alternate samples gated by said first switch means;

second buffer means, coupled to said first switch means, for storing a second set of alternate samples gate by said first switch means; and switch means, coupled to said first and second buffer means, for gating signals from said first and second buffer means such that said signals are gated to said display in a format that is scanned in a linear manner.

17. The arrangement in accordance with claim 16 wherein said first and second buffer means store at least 910 samples each.

* * * * *